United States Patent [19]

Nagaoka

[11] Patent Number: 5,217,651
[45] Date of Patent: Jun. 8, 1993

[54] ROOM TEMPERATURE VULCANIZING TYPE ELECTROCONDUCTIVE SILICONE RUBBER COMPOSITION

[75] Inventor: Hisayuki Nagaoka, Gunma, Japan

[73] Assignee: Toshiba Silicone Co., Ltd., Tokyo, Japan

[21] Appl. No.: 331,206

[22] Filed: Mar. 31, 1989

[30] Foreign Application Priority Data

Apr. 1, 1988 [JP] Japan ................................. 63-80456

[51] Int. Cl.$^5$ .......................... H01B 1/00; H01B 1/20; H01B 1/22
[52] U.S. Cl. ..................................... 252/518; 252/520; 252/521; 528/12; 528/18; 528/20; 528/31; 528/33
[58] Field of Search .................. 252/518, 520, 521; 528/12, 18, 20, 31, 32, 33

[56] References Cited

U.S. PATENT DOCUMENTS

4,880,703  11/1989  Sakamoto ............................ 252/518

FOREIGN PATENT DOCUMENTS

| | | |
|---|---|---|
| 0112396 | 6/1983 | European Pat. Off. . |
| 0173561 | 8/1985 | European Pat. Off. . |
| 0189995 | 1/1986 | European Pat. Off. . |
| 0210442 | 6/1986 | European Pat. Off. . |
| 3303649 | 8/1984 | Fed. Rep. of Germany . |
| 1273907 | 10/1970 | United Kingdom . |
| 1461435 | 7/1974 | United Kingdom . |

OTHER PUBLICATIONS

Chem. Abstracts 106 (1987).
Chem. Abstracts 108 (1988).
Plastic Engineering (1987) pp. 61-63.

*Primary Examiner*—Paul Lieberman
*Assistant Examiner*—M. Kopec
*Attorney, Agent, or Firm*—Sughrue, Mion, Zinn, Macpeak & Seas

[57] ABSTRACT

A room temperature vulcanizing type electroconductive silicone rubber composition comprising
(A) 100 parts by weight of an organopolysiloxane having in one molecule thereof at least two hydroxyl groups and/or alkoxy groups, said hydroxyl groups and alkoxy groups being bonded to silicon atoms;
(b) 10 to 850 parts by weight of a powdery or fibrous metallic oxide-type electroconductive material showing a white or a light and bright color;
(C) 0.1 to 30 parts by weight of a crosslinking agent;
(D) 0 to 5 parts by weight of a crosslinking catalyst; and
(E) 1 to 500 parts by weight of a volatile organic solvent
is disclosed. The composition can cold cure to form a rubber-like elastomer showing a white color or a light and bright color and having a stable semiconducting properties over a long period of time.

15 Claims, No Drawings

ROOM TEMPERATURE VULCANIZING TYPE ELECTROCONDUCTIVE SILICONE RUBBER COMPOSITION

FIELD OF THE INVENTION

The present invention relates to a room temperature vulcanizing type electroconductive silicone rubber composition. More particularly, it relates to a room temperature vulcanizing type electroconductive silicone rubber composition which provides a cured product showing a white or a light and bright color and also showing stable semiconducting properties over a prolonged period of time by using a metallic oxide as an electroconductive filler and further incorporating a volatile organic compound.

BACKGROUND OF THE INVENTION

In the production of electronic machines and apparatus including a computer, and semiconductors such as an IC and LSI constituting the hearts thereof, a purified chamber called a clean room is necessary for the prevention of discharge breakdown due to static electricity and the adhesion of dust, and such rooms have recently being employed increasingly.

For the walls and floor of the clean room are being employed antistatic materials, and a silicone-type sealant and the like have been used for the sealing of the joints between the antistatic materials. However, since those sealed joint portions obtained from such a silicone-type sealant are electrostatically charged, causing the dust to adhere thereto, electroconductive sealants such as a carbon or metallic type sealant are replacing silicone-type sealants.

However, there is a problem that the color of such an electroconductive sealant does not match with that of the walls and floor and spoils the appearance of the clean room, because the electroconductive sealant is generally a carbon or metallic type and has a dark shade of color such as black or brown in contrast to the white or light and bright color of the walls and floor. Further, from the standpoint of the prevention of dust adhesion, the high electroconductivity of the carbon-type or metallic-type electroconductive sealant is unnecessary, and intermediate electroconductivity, i.e., semiconductivity, is sufficient. Not only is such high electroconductivity unnecessary, but also there is a fear that the sealing with a sealant having too high an electroconductivity is dangerous because of a possible discharge breakdown.

SUMMARY OF THE INVENTION

Accordingly, an object of the present invention is to provide a room temperature vulcanizing type electroconductive silicone rubber composition which contains a condensation-type liquid silicone rubber compound and a specific filler and cures to form a product showing stable semiconducting properties over a prolonged period of time and showing a white or a light and bright color, thereby overcoming the above-described problems.

As a result of extensive and intensive studies to achieve the above object, it has been found that by using a powdery or fibrous metallic oxide having a white or a light and bright color as an electroconductive filler and by incorporating a volatile organic compound, the resulting cured composition shows a white or light and bright color without suffering discoloration and also shows stable semiconductivity. On the basis of this novel findings, the present invention has been completed.

The room temperature vulcanizing type electroconductive silicone rubber composition according to the present invention comprises (A) 100 parts by weight of an organopolysiloxane having in one molecule thereof at least two hydroxyl groups and/or alkoxy groups, the hydroxyl groups and alkoxy groups being bonded to silicon atoms;

(B) 10 to 850 parts by weight of a powdery or fibrous metallic oxide-type electroconductive material which shows a white or a light and bright color;

(C) 0.1 to 30 parts by weight of a crosslinking agent;

(D) 0 to 5 parts by weight of a crosslinking catalyst; and (E) 1 to 500 parts by weight of a volatile organic solvent.

DETAILED DESCRIPTION OF THE INVENTION

The term "room temperature vulcanizing type" is hereinafter referred to as "RTV type". Further, a product obtained from the RTV type electroconductive silicone rubber composition according to the present invention is referred to as a "cured" product.

The composition of the present invention means a composition from which a solvent has substantially been removed, and also has semiconducting properties.

The organopolysiloxane which can be used as the component A in the composition of the present invention is a base polymer which is generally used in a conventional RTV type condensation-type polysiloxane composition. The component A preferably has a viscosity as measured at 25° C. in the range of from 100 to 100,000 cSt, more preferably from 500 to 50,000 cSt, in order to impart excellent mechanical properties to the cured rubber-like elastomer. If the viscosity is less than 100 cSt, the resulting cured rubber-like elastomer shows poor stretchability and mechanical strength, while if it exceeds 100,000 cSt, the viscosity of the resulting composition is also so high that the composition in use shows poor workability and processability.

Examples of other organic groups than hydroxyl and alkoxy groups, bonded directly to silicon atoms in the organopolysiloxane include alkyl groups such as a methyl group, an ethyl group, a propyl group, a butyl group and a hexyl group; cycloalkyl groups such as a cyclopentyl group and a cyclohexyl group; alkenyl groups such as a vinyl group and an allyl group; aryl groups such as a phenyl group, a tolyl group and a naphtyl group; aralkyl groups such as a 2-phenylethyl group; and substituted monovalent hydrocarbon groups such as a 3,3,3-trifluoropropyl group, a chloroethyl group, a β-cyanoethyl group and a γ-aminopropyl group. Of those groups, a methyl, vinyl or phenyl group is generally advantageous from the staindpoint of the easy synthesis of the organopolysiloxane. Of the, a methyl group is particularly advantageous, because not only an intermediate product can be most easily obtained but also the resulting composition gives a cured rubber-like elastomer having well-balanced physical properties. It is preferred that 85% or more of all the organic groups in the organopolysiloxane be methyl groups, and from the practical standpoint, it is more preferred that all the organic groups be methyl groups.

Preferably, the molecules of the organopolysiloxane are straight-chain form, but they may of course contain some branched molecules. It is preferred that both end groups of each molecule by substantially hydroxyl, but the molecules may include molecules in which part of the hydroxyl groups have been replaced with alkoxy groups which are a hydrolyzable group.

The electroconductive material, component B, in the composition of the present invention is an essential ingredient for imparting, to the final cured composition, semiconducting properties together with a white or a light and bright color. Examples of the component B include potassium titanate surface-treated with antimony oxide-tin oxide, titanium oxide surface-treated with antimony oxide-tin oxide, or the like. The component B may be in a particulate, flaky, fibrous or similar form. The amount of the component B incorporated into the composition should be in the range of from 10 to 850 parts by weight, preferably from 50 to 700 parts by weight, per 100 parts by weight of the component A. If the amount thereof is less than 10 parts by weight, stable electroconductivity cannot be obtained, while amounts exceeding 850 parts by weight are not preferred in that the workability of the resulting composition at the time of its application is poor.

The crosslinking agent, component C, in the composition of the present invention serves to cure the composition into a rubber-like elastomer through condensation reaction with the terminal hydroxyl groups of the component A. The component C is a silane or at least one of its partially hydrolyzed condensation products represented by the formula:

$$R^1{}_a SiZ_{4-a}$$

wherein $R^1$ represents a monovalent hydrocarbon group, Z represents a hydrolyzable group, and a is an integer of from 0 to 2. Examples of $R^1$ include the same organic groups for the component A, and also include iminoalkyl groups etc., represented by the following formulae or similar formulae:

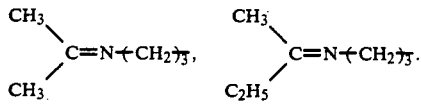

Examples of the hydrolyzable group, Z, include alkoxy groups such as a methoxy group, an ethoxy group and a propoxy group; alkenyloxy groups such as an isopropenyl group and a 1-ethyl-2-methylvinyloxy group; ketoxime groups such as a dimethyl ketoxime group, a methyl ethyl ketoxime group and a diethyl ketoxime group; acyloxy groups such as an acetoxy group, an octanoxyloxy group and a benzoyloxy group; amino groups such as a dimethylamino group, a diethylamino group, a butylamino group and a cyclohexylamino group; aminooxy groups such as a dimethylaminooxy group and a diethylaminooxy group; amido groups such as an N-methylacetamido group, an N-ethylacetamido group and an N-methylbenzamido group; and the like.

Examples of the crosslinking agent include ethyl silicate, propyl silicate, methyltrimethoxysilane, vinyltrimethoxysilane, methyltriethoxysilane, vinyltriethoxysilane, methyltris(methoxyethoxy)silane, vinyltris(methoxyethoxy)silane, methyltripopenoxysilane, methyltriacetoxysilane, vinyltriacetoxysilane, methyltri(acetone oxime)silane, vinyltri(acetone oxime)silane, methyltri(methyl ethyl ketoxime)silane, vinyltri(methyl ethyl ketoxime)silane, and the like, and condensation products thereof obtained through partial hydrolysis.

Examples of the crosslinking agent further include cyclic siloxanes such as hexamethyl-bis(diethylaminooxy)cyclotetrasiloxane, tetramethyldibutyl-bis(diethylaminooxy)cycloetetrasiloxane, heptamethyl(diethylaminooxy)cycloetetrasiloxane, pentamethyl-tris(diethylaminooxy)cyclotetrasiloxane, hexamethyl-bis(methylethylaminooxy)cycloetetrasiloxane, tetramethyl-bis(diethylaminooxy)-mono(methylethylaminooxy)cyclotetrasiloxane and the like. Thus, the molecular structure of the crosslinking agent may be of a silane and/or siloxane type, and that of a siloxane type may be straight-chain or branched or cyclic. Further, the crosslinking agent used is not limited to one kind, and the above-described compounds may also be used in combination of two or more thereof.

The amount of the component C which is incorporated in the composition is in the range of from 0.1 to 30 parts by weight per 100 parts by weight of the component A. If the amount of the component C is less than 0.1 part by weight, the resulting composition suffers gellation during preparation or storage, whereby an intended composition or final cured product cannot be obtained. If the amount thereof exceeds 30 parts by weight, the curing of the resulting composition is disadvantageously retarded, and the electroconductivity and elasticity of the final cured product are impaired.

Component D in the composition of the present invention catalyzes the condensation reaction of hydroxy groups of the component A with the component C. Examples of the component D include metal salts of organic acids such as iron octoate, iron naphthenate, cobalt octoate, cobalt naphthenate, manganese octoate, tin octoate, tin naphthenate, lead octoate and lead naphthenate; organic tin compounds such as dibutyltin diacetate, dibutyltin dioctoate, dibutyltin dilaurate, dimethyltin monooleate, dibutyltin dimethoxide and dibutyltin oxide; metal alcoholates such as tetrabutyl titanate and tetrabutyl zirconate; titanium chelate compounds such as diisopropoxy-bis(acetylacetonato)titanate, diisopropoxy-bis(ethylacetoacetato)titanate, 1,3-propanedioxybis(acetylacetonato)titanate and 1,3-propanedioxybis(ethylacetoacetato)titanate; aminoalkyl group-substituted alkoxysilanes such as γ-aminopropyltriethoxysilane and N-(β-aminoethyl)-γ-aminopropyltrimethoxysilane; amines such as hexylamine, dodecylamine phosphate, dimethylhydroxylamine and diethylhydroxylamine; quarternary ammonium salts such as benzyltriethylammonium acetate; and the like. The crosslinking agent used as the component D is not limited to one kind, and the above-described compounds may be used in combination of two or more thereof.

The amount of the component D which is incorporated in the composition is selected, taking into consideration the application conditions for the intended composition, from the range of from 0 to 5 parts by weight per 100 parts by weight of the component A. The preferred amount thereof is in the range of from 0.01 to 2.5 parts by weight. The incorporation of the component D can be omitted depending on the kind of the component C. However, in the case where its incorporation is essential, a too small amount, less than 0.01 part by weight, of the component D generally necessitates a longer time for the curing of the resulting composition, and unfavorably retards the development of electroconductivity. On the other hand, if it exceeds 5 parts by weight, the curing of the resulting composition proceeds too rapidly, impairing the workability, and also the final cured product disadvantageously shows poor elasticity and heat-resistance.

The volatile organic solvent, component E, in the composition of the present invention serves to maintain the stable electroconductivity of the final cured product over a prolonged period of time and to improve the workability of the composition during processing and forming. The component E used is selected from materials having boiling points, as measured under normal pressure, in the range of from 30° to 300° C.

Examples of such organic solvents include hydrocarbon-type solvents such as toluene, xylene, cyclohexane, n-hexane, n-heptane, n-octane, a naphtha, a mineral spirit, and a petroleum benzine; halogenated hydrocarbon-type solvents such as chloroform, carbon tetrachloride, trichlorethylene, perchloroethylene, 1,1,1-trichloroethane and perfluoropropane; ether-type solvents such as propyl ether, n-butyl ether, anisole, tetrahydrofuran and ethylene glycol diethyl ether; ester-type solvents such as ethyl acetate, butyl acetate and amyl acetate; ketone-type solvents such as acetone, methyl ethyl ketone, methyl isobutyl ketone and acetophenone; alcohol-type solvents such as methanol, ethanol, isopropyl alcohol, butyl alcohol, 2-methoxyethanol, 2-ethoxyethanol, 2-butoxyethanol, ethylene glycol and propylene glycol; chain siloxane-type solvents such as hexamethyldisiloxane, tetramethyldiphenyldisiloxane, octamethyltrisiloxane and decamethyltetrasiloxane; cyclic siloxane-type solvents such as hexamethylcyclotriloxane, octamethylcycloetetrasiloxane, heptamethylphenlcycloetetrasiloxane, heptamethylvinylcycloetetrasiloxane and decamethylcyclopentasiloxane; and the like.

The amount of the component E which is incorporated in the composition is in the range of from 1 to 500 parts by weight, preferably from 3 to 300 parts by weight, per 100 parts by weight of the component A. If the amount is less than 1 part by weight, undesirable unexpected phenomena are encountered. For example, the final rubber-like elastomers cured after storage for a certain period vary greatly in their electroconductivity, and in some cases even show insulating properties. On the other hand, amounts exceeding 500 parts by weight are disadvantageous in that sedimentation of the filler in the resulting composition tends to occur, the shrinkage of the composition upon curing is marked, and volatilization of a large amount of the unnecessary organic solvent from the composition during curing has adverse environmental effects. There is a further disadvantage that an intended thickness cannot be obtained by one application of the composition.

The composition of the present invention is obtained by blending the above-described components A to E by a conventional method to make a uniform dispersion. For example, the component A is introduced into a universal kneading machine or a kneader, and the components B and C are added by portions, each addition being followed by mixing, thereby to uniformly disperse the components B and C into the component A. In order to improve the dispersibility of the components B and C and to obtain a composition which will suffer little change with the lapse of time, the above procedures may be modified such that a part of the component A is left unintroduced and, after the whole components B and C have been introduced, the remaining part of the component A is added thereto. Further, it is also possible to subject the resulting mixture to kneading in a three-roll mill or to heat-kneading. To thus-obtained uniform mixture is cooled to around room temperature, and the crosslinking agent and the organic solvent are then added thereto.

The composition of the present invention can take one-package form or two-package form, or other multi-package forms.

Moreover, aside from the components described hereinbefore, the composition of the present invention can contain, according to need, additives usually employed for silicone rubber compositions, such as a silica-type filler, a plasticizer, a heat stabilizer, a flame retarder, a processing aid or the like. The amounts of those additives may suitably be decided within the ranges not impairing the object of the present invention.

The electroconductive silicone rubber composition comprising the above-described components cures at room temperature to form a rubber-like elastomer showing a white or a light and bright color and also showing stable semiconductivity over a prolonged period of time. Therefore, the composition of the present invention can be advantageously used as a sealant for the joints between the panels constituting walls and floorings in clean rooms or the like, an electroconductive coating composition which is applied on surfaces of such panels, an antistatic agent for electronic machines and apparatus, and the like, and can also be used for making an antistatic layer on the rubber roller in an electrostatic copying machine. Such application of the composition of the present invention can overcome the problem that the appearance of the clean room is spoiled by the application of conventional carbon-type or metallic-type conductive silicone rubber compositions, and is very effective to prevent electrostatic charge and dust adhesion because the cured composition shows stable semiconductivity over a prolonged period of time.

The present invention will be explained in more detail by reference to the following Examples, which should not be construed to be limiting the scope of the invention. In the Examples and Comparative Example, all parts are by weight unless otherwise indicated.

EXAMPLE 1

To 100 parts of $\alpha,\omega$-dihydroxydimethylpolysiloxane having a viscosity as measured at 25° C. of 5,000 cSt was added 483 parts of titanium oxide (bluish-gray color) which had an average particle diameter of 0.1 $\mu$m and had been surface-treated with antimony oxide-tin oxide. This addition was made portion-wise, three portions in total, and each addition was followed by kneading under reduced pressure to prepare a base compound. To this base compound were added 25 parts of xylene, 12.2 parts of methyltris(methyl ethyl ketoxime)silane as a crosslinking agent and 0.10 part of dibutyltin dilaurate as a crosslinking catalyst, and the resulting mixture was kneaded under reduced pressure in a closed vessel, thereby obtaining composition 1.

A half of the composition 1 was allowed to cure at 20° C. and 55% RH for 7 days, thus obtaining a cured composition in the form of a sheet having a thickness of 2 mm. The remaining half of the composition 1 was stored at room temperature for 6 months in one package from which the air was kept excluded, and thereafter, a cured sheet was obtained therefrom under the same conditions as above.

Those cured sheets were evaluated for color and surface electrical resistance. Resistance was measured using a HIOKI digital hitestor #3223. The results obtained are shown in Table 1.

For comparison, composition 0 was prepared under the same conditions as above except that xylene was not used, and a cured sheet was obtained therefrom in the same manner. The color and surface electrical resistance of this sheet were evaluated, and the results are also shown in Table 1.

TABLE 1

| Composition | Storage Period | Color | Surface Electrical Resistance (Ω) |
|---|---|---|---|
| 1 | Initial | Bluish gray | $2 \times 10^6$ |
|  | 6 months | Bluish gray | $3 \times 10^7$ |
| 0 | Initial | Bluish gray | $1 \times 10^{10}$ |
|  | 6 months | Bluish gray | $6 \times 10^{16}$ |

EXAMPLE 2

Using 100 parts of α,ω,-dihydroxydimethylpolysiloxane having a viscosity as measured at 25° C. of 500 cSt, 465 parts of titanium oxide (bluish-white color) which had an average particle diameter of 0.2 to 0.3 μm and had been surface-treated with antimony oxide-tin oxide, 22.7 parts of xylene, 7.6 parts of methyltris(methyl ethyl ketoxime)silane, 4.8 parts of vinyltris(methyl ethyl ketoxime)silane and 0.05 part of dibutyltin dilaurate, composition 2 was prepared in the same manner as in Example 1. The color and surface electrical resistance of a cured sheet obtained immediately after the preparation and a cured sheet after 6 months storage were evaluated. The results are shown in Table 2.

TABLE 2

| Composition | Storage Period | Color | Surface Electrical Resistance (Ω) |
|---|---|---|---|
| 2 | Initial | Bluish white | $8 \times 10^6$ |
|  | 6 months | Bluish white | $6 \times 10^6$ |

EXAMPLE 3

Using 100 parts of α,ω-dihydroxydimethylpolysiloxane having a viscosity as measured at 25° C. of 3,000 cSt, 150 parts of fibrous potassium titanate (greenish-white color) which had an average fiber length of 10 to 20 μm and a fiber diameter of 0.2 to 0.5 μm and had been surface-treated with antimony oxide-tin oxide, 20 parts of toluene, 6.0 parts of vinyltrimethoxysilane and 0.10 part of dibutyltin oxide, composition 3 was prepared in the same manner as in Example 1. The color and surface electrical resistance of a cured sheet obtained immediately after the preparation and a cured sheet after 6 months storage were evaluated. The results are shown in Table 3.

TABLE 3

| Composition | Storage Period | Color | Surface Electrical Resistance (Ω) |
|---|---|---|---|
| 3 | Initial | Greenish white | $2 \times 10^7$ |
|  | 6 months | Greenish white | $1 \times 10^7$ |

EXAMPLES 4

Using 100 parts of α,ω-dihydroxydimethylpolysiloxane having a viscosity as measured at 25° C. of 6,000 cSt, 260 parts of titanium oxide (bluish-white color) which had an average particle diameter of 0.2 μm and had been surface-treated with antimony oxide-tin oxide, 15.0 parts of butyl acetate, 9.7 parts of phenyltriethoxysilane and 0.10 part of dibutyltin dioctoate, composition 4 was prepared in the same manner as in Example 1. The color and surface electrical resistances of a cured sheet obtained immediately after the preparation and a cured sheet after 6 months storage were evaluated. The results are shown in Table 4.

TABLE 4

| Composition | Storage Period | Color | Surface Electrical Resistance (Ω) |
|---|---|---|---|
| 4 | Initial | Bluish white | $2 \times 10^7$ |
|  | 6 months | Bluish white | $3 \times 10^7$ |

COMPARATIVE EXAMPLE

Using 100 parts of α,ω-dihydroxydimethylpolysiloxane having a viscosity as measured at 25° C. of 5,000 cSt, 100 parts of acetylene black, 60 parts of xylene, 20 parts of methyltris(methyl ethyl ketoxime)silane and 0.1 part of dibutyltin dilaurate, composition 5 was prepared in the same manner as in Example 1. The color and surface electrical resistance of a cured sheet obtained therefrom immediately after the preparation were evaluated. The results are shown in Table 5.

TABLE 5

| Composition | Storage Period | Color | Surface Electrical Resistance (Ω) |
|---|---|---|---|
| 5 | Initial | Black | 5 |

While the invention has been described in detail and with reference to specific embodiments thereof, it will be apparent to one skilled in the art that various changes and modifications can be made therein without departing from the spirit and scope thereof.

What is claimed is:

1. A room temperature vulcanizing electroconductive silicone rubber composition comprising,
    (A) 100 parts by weight of an essentially straight chain organopolysiloxane having in one molecule thereof at least two hydroxyl groups, at least two alkoxyl, or a combination of at least one hydroxyl group and at least one alkoxyl group, said hydroxyl groups and alkoxyl groups being bonded to silicon atoms at the ends of the molecule;
    (B) 20 to 850 parts by weight of a powdery or fibrous metallic oxide electroconductive material showing a white or light and bright color, selected from the group consisting of potassium titanate surface-treated with antimony oxide-tin oxide and titanium oxide surface-treated with antimony oxide-tin oxide;
    (C) 0.1 to 30 parts by weight of a crosslinking agent;
    (D) 0 to 5 parts by weight of a crosslinking catalyst; and
    (E) 1 to 500 parts by weight of a volatile organic solvent having a boiling point of 30° to 300° C.

2. A composition as claimed in claim 1, wherein said organopolysiloxane (A) has a viscosity as measured at 25° C. of 100 to 100,000 cSt.

3. A composition as claimed in claim 2, wherein the viscosity is 500 to 50,000 cSt.

4. A composition as claimed in claim 1, wherein at least 85% of organic groups directly bonded to silicone atoms in the organopolysiloxane is methyl group.

5. A composition as claimed in claim 4, wherein all the organic groups are methyl group.

6. A composition as claimed in claim 1, wherein the amount of the powdery or fibrous metallic oxide electroconductive material (B) is 50 to 700 parts by weight.

7. A composition as claimed in claim 1, wherein the crosslinking agent (C) is a silane or at least one of its partially hydrolyzed condensation product represented by the formula $$R^1_a SiZ_{4-a}$$

wherein $R^1$ represents a monovalent hydrocarbon group, Z represents a hydrolyzable group, and a is an integer of 0 to 2.

8. A composition as claimed in claim 1, wherein the crosslinking catalyst (D) is at least one member selected from the group consisting of metal salts of organic acids, amines and quarternary ammonium salts.

9. A composition as claimed in claim 1, wherein the amount of the crosslinking catalyst (D) is 0.01 to 2.5 parts by weight.

10. A composition as claimed in claim 1, wherein the volatile organic solvent is selected from the group consisting of toluene, xylene, cyclohexane, n-heptane, n-octane, a naphtha, a mineral spirit, a petroleum benzine, chloroform, carbon tetrachloride, trichloroethylene, perchloroethylene, 1,1,1-trichloroethane, perfluoropropane, propyl ether, n-butyl ether, anisole, tetrahydrofuran, ethylene glycol diethyl ether, ethyl acetate, butyl acetate, amyl acetate, acetone, methyl ethyl ketone, methyl isobutyl ketone, acetophenone, methanol, ethanol, isopropyl alcohol, butyl alchohol, 2-methoxyethanol, 2-ethoxyethanol, 2-butoxyethanol, ethylene glycol, propylene glycol, hexamethyldisiloxane tetramethyldiphenyldisiloxane, octamethyltrisiloxane, decamethyltetrasiloxane, hexamethylcyclotrisiloxane, octamethylcyclotetrasiloxane, heptamethylphenylcyclotetrasiloxane, heptamethylvinylcyclotetrasiloxane and decamethylcyclopentasiloxane.

11. A composition as claimed in claim 1, wherein the amount of the volatile organic solvent is 3 to 300 parts by weight.

12. A composition as claimed in claim 1, wherein the crosslinking catalyst (D) is an organic tin compound.

13. A composition as claimed in claim 1, wherein the crosslinking catalyst (D) is a metal alcoholate.

14. A composition as claimed in claim 1, wherein the crosslinking catalyst (D) is a titanium chelate compounds.

15. A composition as claimed in claim 1, wherein the crosslinking catalyst (D) is an aminoalkyl group-substituted alkoxysilane.

* * * * *